United States Patent [19]

Chen et al.

[11] Patent Number: 4,711,710
[45] Date of Patent: Dec. 8, 1987

[54] PROCESS FOR MAKING IMPROVED LUBRICATING OILS FROM HEAVY FEEDSTOCK

[75] Inventors: Nai Y. Chen, Titusville, N.J.; Thomas F. Degnan, Jr., Yardley, Pa.; Susan M. Leiby, Mantua, N.J.; Stephen M. Oleck, Moorestown, N.J.; Bruce P. Pelrine, Lawrenceville, N.J.

[73] Assignee: Mobil Oil Corporation, New York, N.Y.

[21] Appl. No.: 938,214

[22] Filed: Dec. 5, 1986

Related U.S. Application Data

[63] Continuation of Ser. No. 778,748, Sep. 23, 1985, abandoned.

[51] Int. Cl.$^4$ ............... C10G 11/05; C10G 11/10; C10G 45/64; C10G 47/16
[52] U.S. Cl. .................................. 208/111; 208/120
[58] Field of Search .......................... 208/111, 120

[56] References Cited

U.S. PATENT DOCUMENTS

| | | | |
|---|---|---|---|
| 3,894,938 | 7/1975 | Gorring et al. | 208/97 |
| 3,926,782 | 12/1975 | Plank et al. | 208/135 |
| 4,263,126 | 4/1981 | Rollmann | 208/14 |
| 4,269,695 | 5/1981 | Silk et al. | 208/111 |
| 4,419,218 | 12/1983 | Angevine et al. | 208/59 |
| 4,441,990 | 4/1984 | Huang | 208/111 |
| 4,443,554 | 4/1984 | Dessau | 502/71 |
| 4,448,671 | 5/1984 | Dessau | 208/26 |

FOREIGN PATENT DOCUMENTS 2055120 2/1981 United Kingdom .

*Primary Examiner*—Olik Chaudhuri
*Attorney, Agent, or Firm*—Alexander J. McKillop; Michael G. Gilman; Malcolm D. Keen

[57] ABSTRACT

There is disclosed an improved dewaxing process which will operate for longer periods of time involving contacting a feedstock having a 50 volume percent boiling point greater than 900° F. with a crystalline aluminosilicate zeolite having a Constraint Index of from 1 to 12 and a silica-to-alumina ratio of at least 12. The crystalline aluminosilicate zeolite is composited with an inorganic oxide, such as alumina. The composite also containing a hydrogenation metal and the catalyst composite has a maximum diffusion distance of less than 0.025 inch.

24 Claims, 6 Drawing Figures

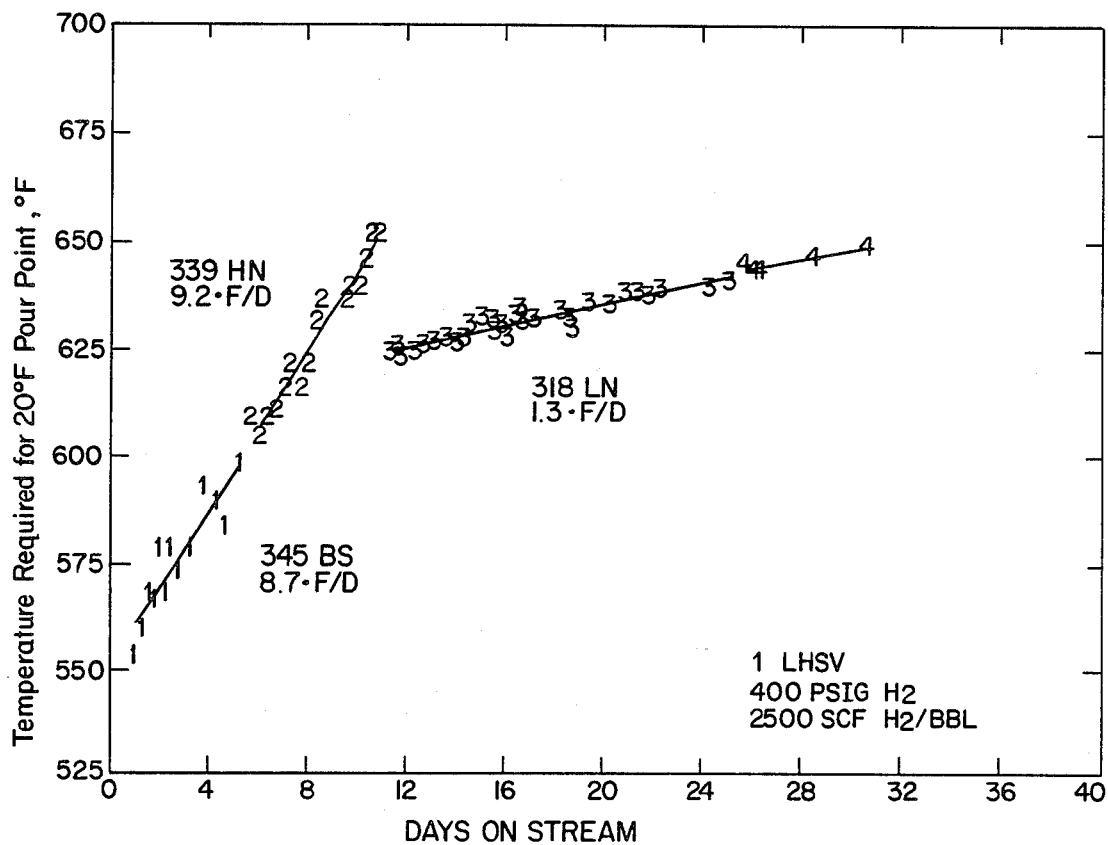
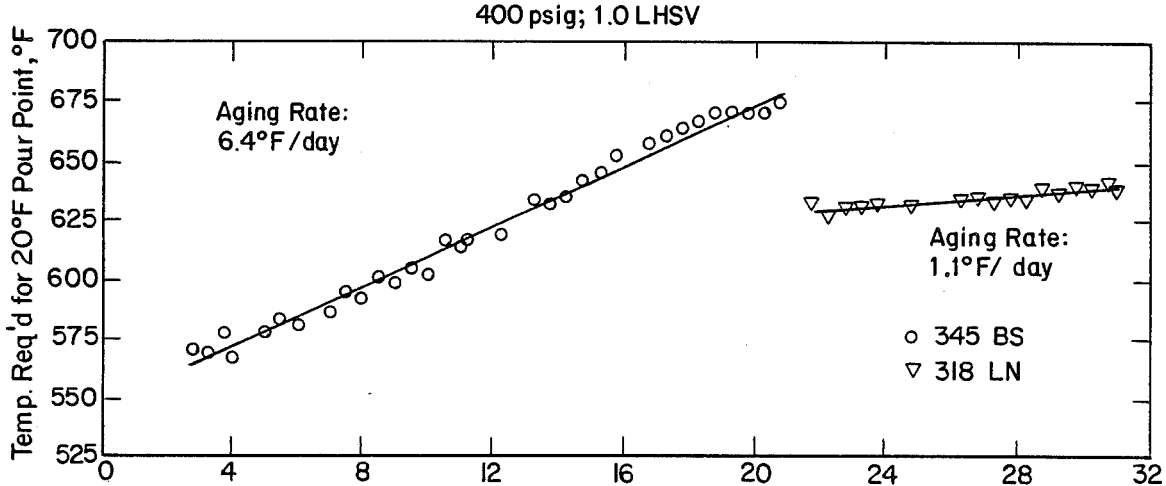

Dewaxing of Arabian Light
339 HN (Stock B)
Catalysts Example 4 and Example 5
Cycle 1

Dewaxing of Arabian Light
339 HN (Stock B)
Catalysts Example 4 and Example 5
Cycle 2

Dewaxing of Arabian Light
345 BS (Stock A)
Catalysts Example 4 and Example 5
Cycle 3

Dewaxing of Arabian Light
Bright Stock (Stock D)
Effect of Catalyst Particle Size

PROCESS FOR MAKING IMPROVED LUBRICATING OILS FROM HEAVY FEEDSTOCK

This is a continuation of copending application Ser. No. 778,748, filed on Sept. 23, 1985 now abandoned.

BACKGROUND OF THE INVENTION

1. Field of the Invention

This invention is concerned with manufacture of high grade viscous oil products from crude petroleum fractions or other hydrocarbon materials. It is particularly directed to the manufacture of high quality lube basestock oils from crude stocks of high boiling point as opposed to using so-called light stocks. The latter crudes have lower boiling points and for reasons which are not fully understood, do not show any advantage in the novel process of this invention over commercially practiced technology. More specifically, the invention is concerned with dewaxing of lube basestock oils having an initial boiling point higher than 700° F. and a 50 volume percent boiling point of at least 900° F.

2. Description of the Prior Art

High quality lube basestock oils are conventionally prepared by refining distillate fractions or the residuum prepared by vacuum distilling a suitable crude oil from which the lighter portion has been removed by distillation in an atmospheric tower. Thus, the charge to the vacuum tower is commonly referred to as a "long residuum" and residuum from the vacuum tower is distinguished from the starting material by referring to it as the "short residuum".

The vacuum distillate fractions are upgraded by a sequence of unit operations, the first of which is solvent extraction with a solvent selective for aromatic hydrocarbons. This step serves to remove aromatic hydrocarbons of low viscosity index and provides a raffinate of improved viscosity index and quality. Various processes have been used in this extraction stage, and these employ solvents such as furfural, phenol, sulfur dioxide, and others. The short residuum, because it contains most of the asphaltenes of the crude oil, is conventionally treated to remove these asphalt-like constituents prior to solvent extraction to increase the viscosity index.

The raffinate from the solvent extraction step contains paraffins which adversely affect the pour point. Thus, the waxy raffinate, regardless of whether prepared from a distillate fraction or from the short residuum, must be dewaxed. Various dewaxing procedures have been used, and the art has gone in the direction of treatment with a solvent such as methyl ethyl ketone/toluene mixtures to remove the wax and prepare a dewaxed raffinate. The dewaxed raffinate may then be finished by any number of sorption or catalytic processes to improve color and oxidation stability.

In recent years techniques have become available for catalytic dewaxing the petroleum stocks. A process of that nature developed by British Petroleum is described in the Oil and Gas Journal dated Jan. 6, 1975, at pages 69–73. See, also, U.S. Pat. No. 3,668,113.

In U.S. Pat. No. Re. 28,398 is described a process for catalytic dewaxing with a catalyst comprising zeolite ZSM-5. Such process combined with catalytic hydrofinishing is described in U.S. Pat. No. 3,894,938 for reducing the pour point of a sulfur and nitrogen-containing gas oil boiling within the range of 400°–900° F.

In U.S. Pat. No. 3,979,279, a stabilized lubricating oil stock resistant to oxidation and sludge formation upon exposure to a highly oxidated environment is formed by contacting a high viscosity lubricating oil stock with hydrogen in the presence of a catalyst of low acidity comprised of a platinum-group metal on a solid refractory inorganic oxide support.

In U.S. Pat. No. 3,530,061, a stabilized lube oil product obtained by hydrocracking is produced by contacting a lube oil product before or after dewaxing with a catalyst having hydrogenation-dehydrogenation activity and hydrogen at a pressure in the range from atmospheric up to about 1000 psig under conditions of temperature in the range of 400° F. to about 800° F.

A two-stage process for preparing a high quality lube basestock oil is disclosed in U.S. Pat. No. 4,181,598 in which a raffinate is mixed with hydrogen and the mixture contacted with a dewaxing catalyst comprising a ZSM-5 type catalyst to convert the wax contained in the raffinate to low boiling hydrocarbons and subsequently, contacting the dewaxed raffinate in the presence of hydrogen at a temperature of 425° to 600° F. with a hydrotreating catalyst comprising a hydrogenation component on a non-acid support such as cobalt-molybdate or nickel-molybdate on alumina. Hydrotreating the dewaxed raffinate is limited to saturate olefins and reduce product color without causing appreciable desulfurization.

U.S. Pat. No. 3,755,145 discloses a process for preparing lube oil having low pour points involving using a catalyst mixture comprising hydrogenation components, a conventional cracking catalyst and a crystalline aluminosilicate zeolite of the ZSM-5 type. At Column 8 there is specifically disclosed the use of an extrudate having a 1/16th of an inch diameter.

U.S. Pat. No. 3,894,938 discloses the catalytic dewaxing and desulfurization of gas oils with a ZSM-5 zeolite containing a hydrogenation component. At Column 3 it is specifically pointed out that the ZSM-5 can be incorporated into a matrix and that the catalyst particles can be sized between 1/32nd and ⅛th of an inch.

U.S. Pat. No. 3,846,337 discloses silica-bound silicate particles of improved strength within the range of 1/32 to about ⅛ inch average extrudate diameter and their use in various catalysts reactions.

It has now been found that an improved dewaxing process which exhibits enhanced activity and longer cycle lengths than present commercial dewaxing catalysts may be obtained by utilizing a catalyst composite comprising a crystalline aluminosilicate having a silica-to-alumina ratio of at least about 12 and a Constraint Index of about 1–12 which is dispersed in an inorganic oxide matrix and which optionally contains a hydrogenation component wherein the maximum diffusion distance in the catalyst is less than 0.025 inch and preferably less than 0.02 inch. In the special case of a cylindrical extrudate, the maximum diffusion distance is equal to one-half of the diameter. The diameter of the finished extrudate is less than about 0.05 inch, and more preferably less than about 0.04 inch. A more preferred extrudate size is about 0.03125 inch.

The catalyst form is not limited to extrudates but can be bead shaped, of monolithic support, etc. The extrudate form is not limited to cylinders, but can be triangular, polylobed (e.g. trilobe, quadrulobe, etc.), rectangular, or of other similar form. The extrudate may also contain a central hole lengthwise through the extrudate. Other forms should be equally acceptable. The invention lies in controlling the catalyst's maximum diffusion distance to less than 0.025 inch.

SUMMARY OF THE INVENTION

It has now been found that an improved catalytic dewaxing operation can be achieved when dewaxing petroleum or other hydrocarbon feedstocks, having a 50 volume percent boiling point of at least 900° F., by utilizing the conventional ZSM-5 type catalyst, matrix and optionally a hydrogenation component combination, well known in the art, but forming said catalyst into an extrudate or other form which has a substantially smaller diffusion distance than has heretofore been used in commercial operations. As will be demonstrated later, the novel process of this invention simply does not result in having added advantages when utilized with a petroleum feedstock which does not possess the boiling characteristics previously set forth.

BRIEF DESCRIPTION OF THE DRAWINGS

FIG. 1 is a graph of actual experimental data illustrating the temperature requirements to catalytically dewax a lube stock whose boiling range lies outside the scope of the present invention. The catalyst used is the reference catalyst (0.0625 inch extrudate).

FIG. 2 is a graph of actual experimental data illustrating the temperature requirements to catalytically dewax with the invention catalyst a lube stock whose boiling range lies outside the scope of the invention.

DESCRIPTION OF SPECIFIC EMBODIMENTS

Figure 3:
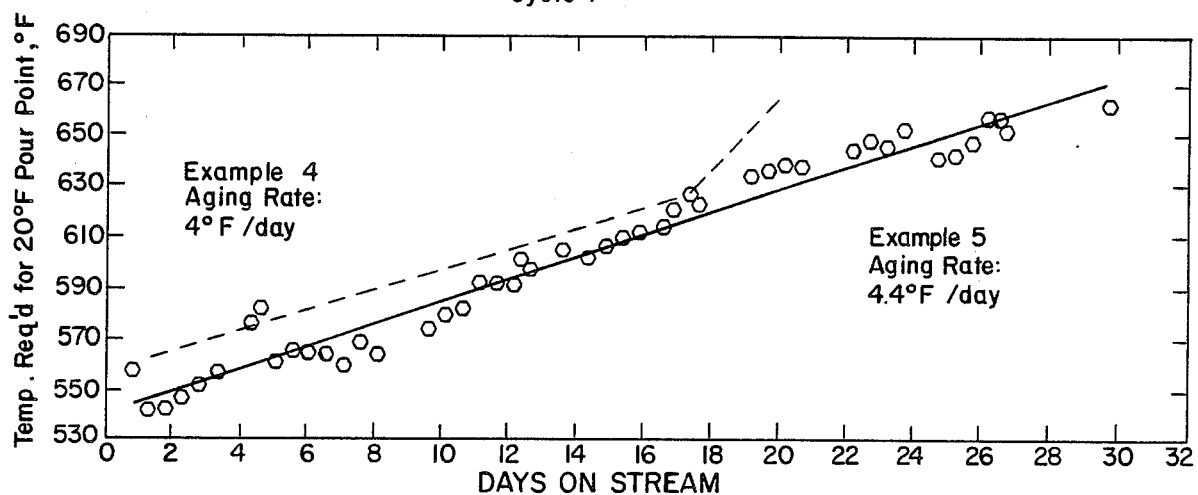
FIG. 3 is a graph of actual experimental data showing the effect of treating a heavy neutral feedstock with an extruded catalyst having a particle diameter of 0.03125 inch (maximum diffusion distance=0.015625 inch) and compared to a reference catalyst of equivalent compositon but having a particle diameter of 0.0625 inch (maximum diffusion distance=0.03125 inch).

The wax base crudes (sometimes called "paraffin base") from which the chargestock is derived by distillation constitute a well-recognized class of crude petroleums. Many scales have been devised for classificaton of crude, some of which are described in Chapter VII, "Evaluation of Oil Stocks" of *Petroleum Refinery Engineering,* by W. L. Nelson, McGraw Hill, 1941. A convenient scale identified by Nelson at page 69 involves determination of the cloud point of the Bureau of Mines (key fraction #2) which boils between 527° F. and 572° F. at 40 mm pressure. If the cloud point of this fraction is above 5° F., the crude is considered wax base.

In practice of the present invention, a suitable chargestock such as a propane deasphalted short residuum fraction or a fraction having an initial boiling point of at least about 875° F., and preferably at least about 900° F., and a final boiling point greater than about 1200° F. is prepared by distillation of such wax base crude. Such fraction can then be solvent refined by counter current extraction with at least an equal volume (100 volume percent) of a selective solvent such a furfural. It is preferred to use about 1.5–3.0 volumes of solvent per volume of oil. The furfural raffinate has an initial boiling point of greater than 700° F. and a 50 volume percent boiling point of at least 900° F. It is then subjected to catalytic dewaxing by mixing in hydrogen and contacting at 450° to 800° F., preferably at 500° F. to 700° F., with a catalyst containing a hydrogenation metal, an inorganic oxide binder and zeolite ZSM-5 or other related silicate zeolites having a silica-to-alumina ratio of at least 12 and a Constraint Index of 1–12 and a liquid hourly space velocity (LHSV) of 0.1–2.0 volumes of charge oil per volume of catalyst per hour. The preferred space velocity is 0.5–1.0 LHSV.

The catalyst is extruded or otherwise shaped so as to have a maximum diffusion distance of less than 0.025 inch.

The catalytic dewaxing reaction is preferably carried out at hydrogen partial pressures of 150 to 3000 psi, at the reactor inlet, and preferably at 250 to 1500 psi. Dewaxing operates at a hydrogen circulation of 500 to 5000 standard cubic feet per barrel of feed (SCF/bbl), preferably 1500 to 3000 SCF/bbl.

The solvent extraction technique is well understood in the art and needs no detailed review here. The severity of extraction is adjusted to composition of the chargestock to meet specifications for the particular lube basestock and the contemplated end-use; this severity will be determined in practice of this invention in accordance with well-established practices.

The catalytic dewaxing step is conducted at temperatures of 450° to 800° F. However, at temperatures above about 675° F., bromine number of the product generally increases and the oxidation stability decreases.

The dewaxing catalyst is a composite of hydrogenation metal, such as nickel, cobalt, molybdenum, chromium, tungsten, palladium, platinum or compositions thereof associated with the acid form of a novel class of aluminosilicate zeolite having a silica-to-alumina ratio of at least about 12, and a constrained access to the intracrystalline free space, as more fully described hereinbelow.

An important characteristic of the crystal structure of this class of zeolites is that it provides constrained access to and egress from the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred type zeolites useful in this invention possesses, in combination: a silica-to-alumina mole ratio of at least about 12; and a structure providing constrained access to the crystalline free space.

The silica-to-alumina ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica-to-alumina ratio of at least 12 are useful, it is preferred to use zeolites having higher ratios of at least about 30. Such zeolites, after activation acquire an intracrystalline sorption capacity for normal hexane which is greater than that for water, i.e., they exhibit "hydrophobic" properties. It is believed that this hydrophobic characteristic is advantageous in the present invention.

The type zeolites useful in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is excluded and the zeolite is not of the desired type. Windows of 10-membered rings are preferred, although in some instances, excessive puckering or pore blockage may render these zeolites ineffective. Twelve membered rings do not generally appear to offer sufficient constraint to produce the advantageous conversions, although puckered structures do exist such as TMA offretite which is a known effective zeolite. Also, structures can be conceived, due to pore blockage or other cause, that may be operative.

Rather than attempt to judge from crystal structure whether or not a zeolite possesses the necessary constrained access, a simple determination of the Constraint Index may be made by passing continuously a mixture of an equal weight of normal hexane and 3-methylpentane over a small sample, approximately 1 gram or less, of catalyst at atmospheric pressure according to the following procedure. A sample of the zeolite, in the form of pellets or extrudates, is crushed to a particle size about that of coarse sand and mounted in a glass tube. Prior to testing, the zeolite is treated with a stream of air at 1000° F. for at least 15 minutes. The zeolite is then flushed with helium and the temperature adjusted between 550° F. and 950° F. to give an overall conversion between 10% and 60 percent. The mixture of hydrocarbons is passed at 1 liquid hourly space velocity (LHSV) (i.e., 1 volume of liquid hydrocarbon per volume of zeolite per hour) over the zeolite with a helium dilution to give a helium to total hydrocarbon mole ratio of 4 to 1. After 20 minutes on stream, a sample of the effluent is taken and analyzed, most conveniently by gas chromatography, to determine the fraction remaining unchanged for each of the two hydrocarbons.

The Constraint Index is calculated as follows:

$$\text{Constraint Index} = \frac{\text{Log}_{10}(\text{fraction of n-hexane remaining})}{\text{Log}_{10}(\text{fraction of 3-methylpentane remaining})}$$

The Constraint Index approximates the ratio of the cracking rate constants for the two hydrocarbons. Zeolites suitable for the present invention are those having a Constraint Index in the apprroximate range of 1 to 12. Constraint Index (CI) values for some typical zeolites are:

| CAS | CI |
|---|---|
| ZSM-5 | 8.3 |
| ZSM-11 | 8.7 |
| ZSM-12 | 2 |
| ZSM-23 | 9.1 |
| ZSM-35 | 4.5 |
| ZSM-38 | 2 |
| TMA Offretite | 3.7 |
| Beta | 0.6 |
| ZSM-4 | 0.5 |
| H-Zeolon | 0.4 |

| -continued | |
|---|---|
| CAS | CI |
| REY | 0.4 |
| Amorphous Silica-alumina | 0.6 |
| Erionite | 38 |

It is to be realized that the above Constraint Index values typically characterize the specified zeolites but that such are the cumulative result of several variables used in determination and calculation thereof. Thus, for a given zeolite depending on the temperature employed within the aforenoted range of 550° to 950° F., with accompanying conversion between 10% and 60%, the Constraint Index may vary within the indicated approximate range of 1 to 12. Likewise, other variables such as the crystal size of the zeolite, the presence of possible occluded contaminants and binders intimately combined with the zeolite affect the Constraint Index. It will accordingly be understood by those skilled in the art that the Constraint Index, as utilized herein, while affording a highly useful means for characterizing the zeolites of interest is approximate, taking into consideration the manner of its determination, with probability, in some instances, of compounding variable extremes. However, in all instances, at a temperature within the above-specified range of 550° F. to 950° F., the Constraint Index will have a value for any given zeolite of interest herein within the approximate range of 1 to 12.

The class of zeolites defined herein is exemplified by ZSM-5, ZSM-11, ZSM-12, ZSM-23, ZSM-35, ZSM-38, and other similar materials. U.S. Pat. No. 3,702,886, describing and claiming ZSM-5 is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

The specific zeolites described, when prepared in the presence of organic cations, are catalytically inactive, possibly because the intracrystalline free space is occupied by organic cations from the forming solution. They may be activated by heating in an inert atmosphere at 1000° F. for 1 hour, for example, followed by base exchange with ammonium salts followed by calcination at 1000° F. in air. The presence of organic cations in the forming solution may not be absolutely essential to the formation of this type zeolite; however, the presence of these cations does appear to favor the formation of this special type of zeolite. More generally, it is desirable to activate this type catalyst by base exchange with ammonium salts followed by calcination in air at about 1000° F. for from about 15 minutes to about 24 hours.

Natural zeolites may sometimes be converted to this type zeolite catalyst by various activation procedures and other treatments such as base exchange, steaming, alumina extraction and calcination, in combinations.

Natural minerals which may be so treated include ferrierite, brewsterite, stilbite, dachiardite, epistilbite, heulandite, and clinoptilolite. The preferred crystalline aluminosilicates are ZSM-5, ZSM-11, ZSM-12, ZSM-23, ZSM-38 and ZSM-35, with ZSM-5 particularly preferred.

When synthesized in the alkali metal form, the zeolite is conveniently converted to the hydrogen form, generally by intermediate formation of the ammonium form as a result of ammonium ion exchange and calcination of the ammonium form to yield the hydrogen form. In addition to the hydrogen form, other forms of the zeolite wherein the original alkali metal has been reduced to less than about 1.5 percent by weight may be used. Thus, the original alkali metal of the zeolite may be replaced by ion exchange with other suitable ions of Groups IB to VIII of the Periodic Table, including, by way of example, nickel, copper, zinc, palladium, calcium or rare earth metals.

In practicing the desired conversion process, it is desirable to incorporate the above-described crystalline aluminosilicate zeolite in another material resistant to the temperature and other conditions employed in the process. Such matrix materials include synthetic or naturally occurring substances as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee-Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-beryllia, silica-titania as well as ternary compositions, such as silica-alumina-thoria, silica-alumina-zirconia, silica-alumina-magnesia and silica-magnesia-zirconia. The relative proportions of zeolite component and inorganic oxide gel matrix may vary widely with the zeolite content ranging from between about 1 to 99 percent by weight and more usually in the range of about 55 to about 80 percent by weight of the composite.

The method of forming the particle or extrudate of the desired diameter size is accomplished according to conventional techniques in the prior art, and no particular novelty is claimed in the method of making the material. In general for forming cylindrical extrudates, a mixture of a suitable zeolite such as ZSM-5 containing a hydrogenation component and an inorganic oxide matrix such as alumina in a suitable weight ratio, i.e., 65 weight percent zeolite; 35 weight percent alumina; are mixed with water and extruded by means of a conventional commercial extruder, such as is manufactured by the Bonnot Co. or Welding Engineers, Inc., having the appropriate diameter hole, i.e., from 0.0125 to 0.05 inch. The extrudate is then dried and calcined at elevated temperatures, i.e., about 1000° F. for about 3 hours. Neither the drying nor the calcination time is particularly critical, and it is the conventional time used in making extrudates.

Polylobes including trilobes and quadrulobes are known in the art and conventional processes for their preparation are disclosed in U.S. Ser. No. 375,079, filed May 1982, now U.S. Pat. No. 4,447,314 the entire disclosure of which as well as the patents referred to therein are hereby incorporated by reference.

Extrusion is also useful for forming other shapes of particles that are desirable for this catalyst. These are formed by using suitable snaped orfrices in the die plate of the extruder. U.S. Pat. No. 3,674,680 to Hoekstra et al represents a suitable extrudate shape; U.S. Pat. No. 3,674,680 uses small catalyst shapes wherein all points in the particles are less than about 0.015 inch from a surface of the particle. Shapes having a configuration of cross, clover leaf, quadrulobe or trilobe such as in U.S. Pat. No. 3,857,780 are operable here, so long as the maximum dimension of the cross section of the lobes or shapes is such that the maximum diffusion distance is less than about 0.025 inches from the particle surface.

Spherical or near-spherical particles within the specified dimension range of the surface are also operable herein. These generally are formed from freshly extruded material, for example, by a process where the extrudate is reshaped in a spinning vessel or drum. Such equipment is available commercially as marumerizers from the Eli Lily Company and others.

The following Examples are given as illustrative of this invention and are not to be construed as limiting thereon except as defined by the claims. In the Examples, all parts are given by weight unless specified otherwise.

EXAMPLES 1-3

Three different lube basestocks were prepared from an Arabian Light crude. Typical properties of the three materials are given in Table 1.

Charge stock A, a 345 bright stock, was prepared by propane deasphalting the vacuum resid. The deasphalted oil was then furfural extracted to reduce the aromatics content.

Charge stock B, a 339 heavy neutral, was prepared by vacuum distillation. This heavy vacuum distillate was then furfural extracted to reduce the aromatics content.

Charge stock C, a 318 light neutral, was also prepared by vacuum distillation. This light vacuum distillate was also furfural extracted to lower the aromatics content.

TABLE 1

| | Charge Stock Properties | | |
|---|---|---|---|
| | A | B | C |
| FEED | Arab Lt. BS | Arab Lt HN | Arab Lt. LN |
| °API | 26.2 | 27.5 | 30.8 |
| H, wt percent | 13.1 | 13.5 | 13.58 |
| S, wt percent | 1.18 | 1.05 | .82 |
| N, ppm | 130 | 97 | 60 |
| Total Acid No. | 0.25 | 0.12 | — |
| CCR, wt percent | .77 | 0.05 | — |
| Pour Point, °F. | 120 | 120 | 100 |
| KV 130° F., cs | | 48.15 | 17.68 |
| KV 212° F., cs | 27.77 | 11.3 | 5.32 |
| KV 300° F., cs | 8.749 | | |
| Distillation | | | |
| IBP, °F. | 812 | 744 | 689 |
| 5 Vol Percent | 903 | 846 | 751 |
| 10 | 933 | 870 | 765 |
| 20 | 966 | 890 | |
| 30 | 993 | 902 | 796 |
| 40 | 1009 | 910 | |
| 50 | 1031 | 918 | 815 |
| 60 | 1054 | 925 | |
| 70 | 1074 | 935 | |

TABLE 1-continued

| | Charge Stock Properties | | |
|---|---|---|---|
| | A | B | C |
| 80 | | 947 | |
| 90 | | 967 | 866 |
| 95 | | 982 | 877 |
| EP | | 1004 | — |

EXAMPLE 4

A nickel ZSM-5 catalyst combined with an alumina matrix and extruded to a diameter of 0.0625 of an inch was prepared as follows:

Dried sodium form ZSM-5 crystals and Kaiser SA alumina powder (alpha alumina monohydrate) were blended in a ratio of 65 parts by wt ZSM-5 and 35 parts by wt $Al_2O_3$ (both on a dry basis), extruded to 0.0625 inch diameter cylinders and calcined for three hours at 1000° F. The calcined product was exchanged with $NH_4NO_3$ solution to low sodium and then with $Ni(NO_3)_2$ solution. It was dried and then calcined at 1000° F. The nickel content was 1.3 weight percent and the sodium was 0.02 weight percent.

The calcined extrudate was then steamed at 900° F. for six hours. The measured alpha activity was 68.

EXAMPLE 5

A nickel ZSM-5 catalyst combined with an alumina matrix and extruded to a diameter of 0.03125 inch was prepared as follows:

This catalyst was pepared by the same procedure as Example 4, except that the extrudates produced were 1/32 inch diameter (0.03125 inch).

The nickel content was 1.0 weight percent and the sodium was 0.03 weight percent. The measured alpha activity was 75.

The physical properties of the catalyst prepared in accordance with Examples 4 and Examples 5 are shown in Table 2.

TABLE 2

| Example | 4 | 5 |
|---|---|---|
| Extrudate Diam., in. | .0625 | .03125 |
| Packed Density, g/cc | 0.57 | 0.616 |
| Particle Density, g/cc | 0.919 | 1.037 |
| Real Density, g/cc | 2.736 | 2.760 |
| Pore Volume, cc/g | 0.722 | 0.602 |
| Surface Area, $m^2/g$ | 352 | 338 |
| Ni, wt percent | 1.3 | 1.0 |
| Na, ppm | 200 | 300 |
| Alpha Activity | 68 | 75 |
| Pore Volume Distribution | | |
| PV Percent of Pores in | | |
| 0-30 Angstrom Diam. | 19 | 24 |
| 30-50 | 9 | 7 |
| 50-80 | 19 | 13 |
| 80-100 | 10 | 9 |
| 100-150 | 13 | 22 |
| 150-200 | 4 | 13 |
| 200-300 | 6 | 9 |
| 300+ | 20 | 3 |

It is to be understood that the catalyst can be employed in the fresh state or can be subjected to a mild steaming treatment at elevated temperatures from about 800° F. to 1500° F. and preferably 800° F. to 1200° F. The treatment may be accomplished in atmospheres of 100 percent steam or at atmospheres consisting of steam and a gas which is substantially inert to the zeolites. A similar treatment can be accomplished at lower temperatures and elevated pressures, e.g., 350° to 700° F. at 10 to about 200 atmospheres.

In the experiments which follow catalysts of Examples 4 and 5 were treated with steam at 900° F. for 6 hours.

EXAMPLE 6

In order to demonstrate that the novel process of this invention does not result in increased benefit with all feedstocks, experiments were carried out using the raffinate identified as Feed C in Table 1. As can be seen, this feedstock is outside the scope of this invention since its 50 volume percent boiling point is below 900° F. Catalysts of Examples 4 and 5 were used to process this feed material to a pour point of ±20° F. The dewaxing conditions are as follows:

| Pressure | 400 PSIG |
|---|---|
| LHSV | 1.0 Voil/Vcat-hr |
| Hydrogen Circulation | 2500 scf/B oil |
| Temperature | 540-680° F. |

FIG. 1 shows the results obtained utilizing the catalyst of Example 4 having a 0.0625 inch diameter extrudate. FIG. 2 shows the results obtained using the catalyst of the invention (0.03125 inch diameter extrudate) (Example 5). Both catalysts had undergone previous dewaxing cycles with subsequent high temperature hydrogen reactivations.

Following relatively rapid initial aging (5°-7° F./day), both catalysts lined out and aged at about 1° F./day. Thus, no advantage is evident for dewaxing light stocks with catalysts having maximum diffusion distances less than 0.03125 inch (i.e., 0.0625 inch diameter extrudate).

EXAMPLE 7

The catalysts of Examples 4 and 5 were used to dewax the heavy neutral raffinate identified as Feed B to a pour point of +20° F. The dewaxing conditions were identical to those used in Example 6.

The results of this experiment are shown in FIG. 3. As can be seen in FIG. 3 the dotted line represents the results obtained with the 0.0625 inch diameter catalyst, i.e., Example 4, whereas the solid line represents a plot of the catalyst of Example 5, i.e., 0.03125 inch diameter. As can be seen, a lower start of cycle temperature was obtained using the 0.03125 inch catalyst, i.e., 540° F. as opposed to the 0.0625 inch catalyst, i.e., 555° F. The 0.0625 inch catalyst aged at 4° F. per day, whereas the 0.03125 inch catalyst aged at 4.4° F. per day, essentially equivalent. As can be seen from the above data, although the 0.03125 inch catalyst resulted in a lower start-of-cycle temperature, its aging rate was equal to the 0.0625 inch catalyst.

EXAMPLE 8

Figure 4:
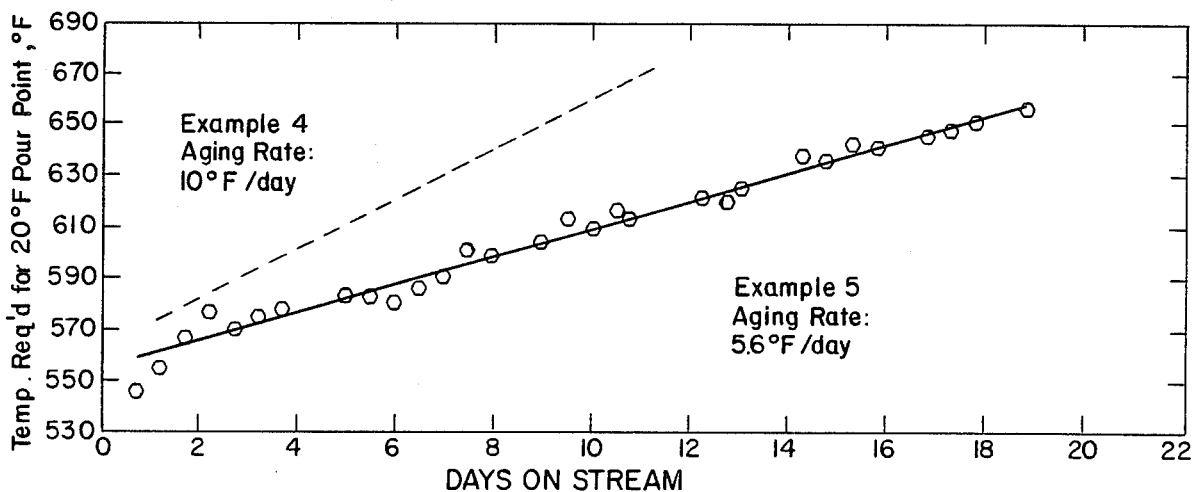
FIG. 4 is a graph of actual experimental data showing the dewaxing of a heavy neutral feedstock on the subsequent cycle to FIG. 3 comparing the same reference and invention catalysts.

After reaching end of cycle conditions, both the catalysts used in Example 6 were reactivated by treatment of the same with hydrogen at about 900° F. for 24 hours. They were then recontacted with the same feedstock used in Example 6 under the exact same operating conditions, and the results are shown in FIG. 4. As can be seen, during the second cycle, the 0.03125 inch diameter catalyst represented by the solid line had a start-of-cycle temperature of 552° F. as compared to 560° F. for the 0.0625 inch diameter catalyst. However, the 0.03125 inch diameter catalyst aged at 5.6° F. per day whereas the 0.0625 inch diameter catalyst aged at 10° F. per day.

Quite obviously, the above experimental results demonstrate the lower aging characteristics of utilizing the smaller extrudate. This advantage was not observed with 318LN (Example 6). Moreover, the advantages of the invention become more pronounced with reactivated catalysts.

EXAMPLE 9

Figure 5:
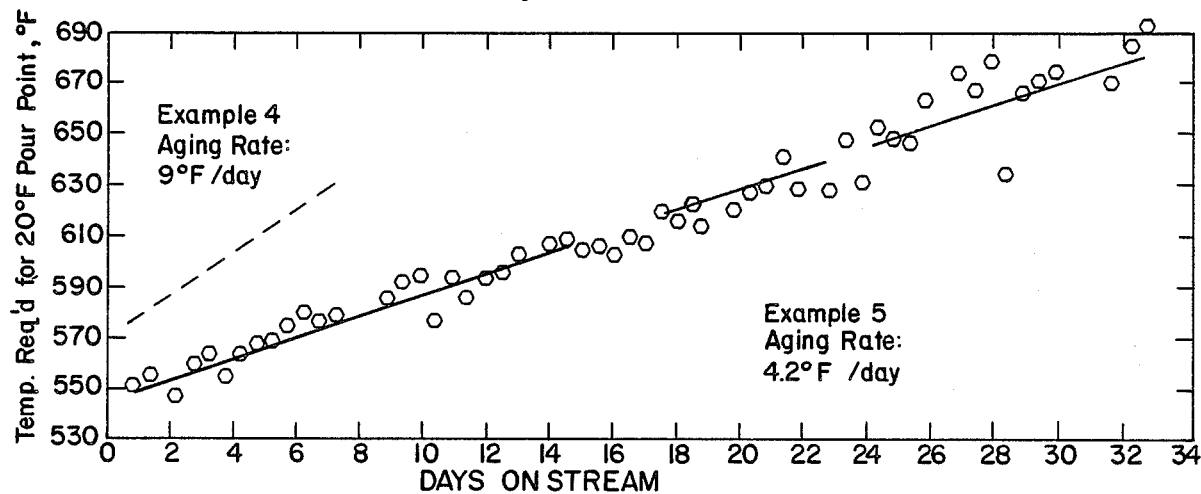
FIG. 5 shows experimental data on the dewaxing of a bright stock using the same reference and invention catalysts shown in FIGS. 3 and 4.

Following the runs of Example 8 both catalysts were again reactivated by heating the same in the presence of hydrogen at 900° F. for 24 hours. The two catalysts were then used to dewax a bright stock having the properties set forth under Feed A in Table 1. The results of the experimentation are shown in FIG. 5. The base case catalyst (0.0625 inch diameter extrudate), as shown by the dashed line, had a 570° F. start-of-cycle activity and aged at 9° F./day. The invention catalyst (0.03125 inch diameter extrudate), as shown by the solid line, had a 544° F. start-of-cycle activity and aged at only 4.2° F./day. This result demonstrates that lowering the catalyst's maximum diffusion distance from 0.03125 to 0.015625 inch directly improved performance for dewaxing bright stock lube material.

EXAMPLE 10

Figure 6:
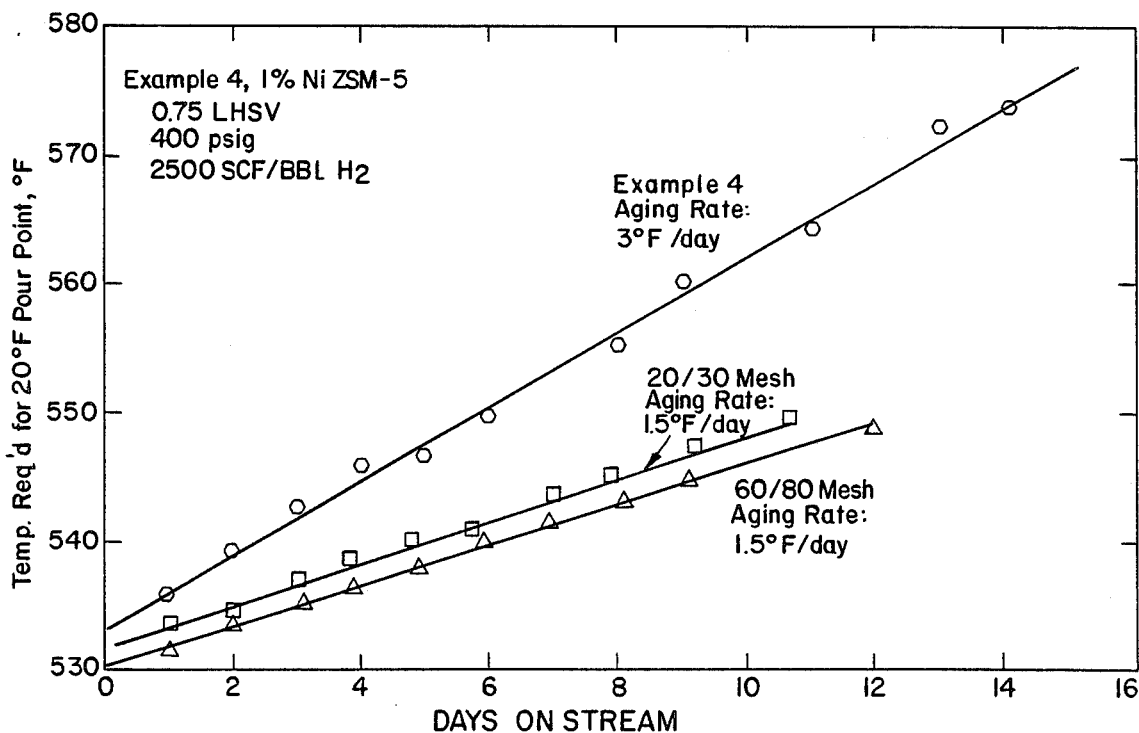
FIG. 6 shows experimental data on the dewaxing of bright stock comparing extruded catalyst and finely crushed catalyst.

The previous examples have cited 1/32nd inch (0.03125 inch) diameter extrudate catalyst. This example demonstrates that a similar catalyst stability benefit can also be achieved by crushing large extrudates to smaller particles having a diffusion length encompassed in this invention. The catalyst of Example 4 was crushed and sieved to two sizes: 20/30 mesh and 60/80 mesh. The average particle sizes were 0.025 inch and 0.005 inch, respectively. Maximum diffusion distances were 0.0125 inch and 0.0025 inch, respectively. These three catalysts were used to dewax an Arabian Light bright stock (see Table 3 for properties) at 0.75 LHSV. The results are shown in FIG. 6. The catalyst of Example 4 extrudate catalyst had a start-of-cycle activity of about 533° F. and aged at 3° F./day. The 20/30 mesh catalyst had a start-of-cycle activity of 532° F. and aged at only 1.5° F./day. Going to smaller particles (i.e. 60/80 mesh size) gave a slight start-of-cycle activity benefit.

TABLE 3

| Arabian Light Bright Stock Properties | |
|---|---|
| Stock | D |
| Specific Gravity | 0.90 |
| Viscosity | |
| KV @ 100 C | 29.71 |
| KV @ 300 F | 9.31 |
| Aniline Point | 251 |
| Elemental Analysis Weight Percent | |
| Carbon | 85.53 |
| Hydrogen | 13.16 |
| Sulfur | 1.31 |
| Nitrogen (ppm) | 130 |
| Basic Nit. (ppm) | 100 |
| Metals (ppm) | |
| Ni | 0.4 |
| V | ND |
| Fe | ND |
| Cu | ND |
| Na | 5.2 |
| Furfural (ppm) | 8.0 |
| Oil Content weight percent | 80.62 |
| Refractive Index (70 C) | 1.4872 |
| CCR (weight percent) | 0.71 |

TABLE 3-continued

| Arabian Light Bright Stock Properties | |
|---|---|
| Paraffins | 18.8 |
| Naphthenes | 42.0 |
| Aromatics | 39.2 |
| Distillation Weight Percent | F |
| IBP | 800 |
| 5 | 912 |
| 10 | 944 |
| 20 | 980 |
| 30 | 998 |
| 40 | 1014 |
| 50 | 1030 |
| 56 | 1045 |

What is claimed is:

1. A process for deaxing a hydrocarbon feedstock characterized by an initial boiling point of at least 700° F. and a 50 volume percent boiling point of at least 900° F. in which the hydrocarbon feedstock is contacted in a fixed bed in the presence of added hydrogen at a temperature of 450° to 800° F. and a space velocity of 0.1-2.0 LHSV with a particulate composite dewaxing catalyst comprising an aluminosilicate zeolite having a silica:alumina ratio of greater than 12:1 and a Constraint Index of 1 to 12 composited with an inorganic oxide binder, the particles of the catalyst composite having a maximum diffusion distance of less than 0.025 inch.

2. The process of claim 1 in which the catalyst composite is in extrudate form having a diameter of less than about 0.05 inch.

3. The process of claim 1 in which the catalyst composite is in extrudata form with a maximum diffusion distance of less than about 4. The progress of claim 1 in which the catalyst composite is in bead or spherical form with a maximum diffusion distance of less than about 0.025 inch.

5. The process of claim 1 in which the catalyst composite is in the form of a hollow centered shaped extrudate with a maximum diffusion distance of less than about 0.025 inch.

6. The process of claim 1 in which the catalyst composite is in a monolithic form having a maximum diffusion distance of les than about 0.025 inch.

7. The process of claim 1 in which the catalyst composite is a trilobe extrudate having a maximum diffusion distance of less than about 0.025 inch.

8. The process of claim 1 in which the catalyst composite is a quadrulobe extrudate having a maximum diffusion distance of less than about 0.025 inch.

9. The process of claim 1 in which the catalyst composte is in pelleted form having a maximum diffusion distance of less than about 0.025 inch.

10. The process of claim 1 in which the inorganic oxide is alumina, silica or silica-alumina.

11. The process of claim 10 in which the crystalline aluinosilicate zeolite is ZSM-5.

12. The process of claim 10 in which the crystalline aluminosilicate is ZSM-11.

13. The process of claim 10 in which the catalyst includes a hydrogenation component.

14. The process of claim 13 in which hydrogenation component comprises at least one of nickel, cobalt, chromium, molybdenum and tungsten.

15. The process of claim 13 in which the hydrogenation component comprises nickel.

16. The process of claim 13 in which the hydrogenation component comprises at least one of palladium or platinum.

17. The process of claim 1 in which the inorganic oxide is alumina, the crystalline aluminosilicate zeolite is ZSM-5, the hydrogenation metal is nickel and the catalyst composite is an extrudata having a diameter of 0.03125 inch.

18. The process of claim 17 in which the catalyst is a polylobe extrudate having a maximum diffusion distance of less than 0.025 inch.

19. The process of claim 1 in whiCh the space veloCity is from 0.5 to 1.0 LHSV.

20. A process for dewaxing a hydrocarbon feedstock characterized by an initial boiling point of at least 700° F. and a 50 volume percent boiling point of at least 900° F. in which the hyrocarbon feedstock is contacted in a fixed bed in the presence of added hydrogen at a temperature of 450° F. to 800° F. with a particulate composite dewaxing catalyst comprising an aluminosilicate zeolite having a silica:alumina ratio of greater than 12:1 and a Constraint Index of 1 to 12 composited with an inorganic oxide binder, the particles of the catalyst composite having a maximum diffusion distance of less than 0.025 inch.

21. A process according to claim 20 in which the zeolite is ZSM-5.

22. A process accoring to claim 20 in which the catalyst includes a hydrogenation component.

23. A process according to claim 22 in which the hydrogenation component comprises nickel.

24. A process for dewaxing a hydrocarbon feedstock characterized by an initial boiling point of at least 700° F. and a 50 volume percent boiling point of at least 900° F. in which the hydrocarbon feedstock is contacted in a trickle bed in the presence of added hydrogen at a temperature of 450° to 800° F. with a particulate composite dewaxing catalyst comprising an extrudate of an aluminosilicate aeolite having a silica:alumina ratio of greater than 12:1 and a Constraint Index of 1 to 12 composited with an inorganic oxide binder, the particles of the catalyst composite having a maximum diffusion distance of less than 0.025 inch.

* * * * *

UNITED STATES PATENT AND TRADEMARK OFFICE
CERTIFICATE OF CORRECTION

PATENT NO. : 4,711,710

DATED : December 8, 1987

INVENTOR(S) : Nai Yuen CHEN et al

It is certified that error appears in the above-identified patent and that said Letters Patent is hereby corrected as shown below:

Column 10, line 13: "$\pm$20 F." should read --+20°F.--.

-- The process of claim 1 in which the catalyst composite is in extrudate form with a diameter of about 0.03125 inch. --.

Signed and Sealed this

Second Day of August, 1988

Attest:

DONALD J. QUIGG

Attesting Officer

Commissioner of Patents and Trademarks